United States Patent Office

3,662,043
Patented May 9, 1972

---

3,662,043
PROCESS FOR MAKING A POLYURETHANE FOAM/EXPANDABLE THERMOPLASTIC PARTICLE COMPOSITE WITH HIGH FREQUENCY ELECTRICAL HEATING
Louis C. Rubens, Midland, Mich., assignor to The Dow Chemical Company, Midland, Mich.
No Drawing. Filed May 11, 1970, Ser. No. 36,432
Int. Cl. B29d 27/04; B29h 5/26
U.S. Cl. 264—26                                   5 Claims

ABSTRACT OF THE DISCLOSURE

Where the exotherm from the polyurethane reaction is insufficient to cause expansion of expanded thermoplastic particles (beads) dispersed therein the particles may be substantially fully expanded by subjecting the composite foam to high frequency electrical energy for a time sufficient to expand them. This improved process is rapid, readily controlled and produces improved foam composites.

BACKGROUND OF THE INVENTION

The preparation of foam composites from a mixture of expandable thermoplastic particles containing a blowing agent and a self-reacting exothermic foam forming precursor wherein the precursor reacts exothermally to produce a cellular (foam) matrix and the exotherm of the reaction causes expansion of the thermoplastic articles is known. The resulting product is called a foam composite since it comprises a foam matrix having dispersed therein foamed thermoplastic particles.

U.S. 2,959,508 describes such a process wherein the exothermic material may be a variety of materials such as an epoxy resin and the thermoplastic a polymer such as polystyrene beads containing pentane or some other similar blowing agent. Other similar processes are described in U.S. 2,958,905; U.S. 3,251,916; Canada 762,-531 and U.S. 3,277, 026. Polyurethane matrix foams are disclosed in the above art but certain problems are encountered when preparing polyurethane foam composites.

One problem concerns the exotherm from the polyurethane reaction. Frequently, this exotherm is insufficient to completely expand all the polystyrene expandable beads or the like dispersed in the foam. While with some higher melting thermoplastics no expansion at all occurs, with polystyrene some beads may be fully expanded (usually in the center where the temperature is highest), others may be partly expanded and others may be essentially unexpanded. This of course, is highly undesirable since the foam composite will have variable properties and properties less than the ultimate attainable if all the beads were fully expanded.

It has been proposed to subject the composite to external heat sources to implement the expansion but this causes additional problems in that the foam composite is a poor conductor of heat. If higher temperatures are used to speed up the conduction of heat the beads closest to the surface (to the heat source) may thermally collapse or the foam itself may be degraded. If lower temperatures and a longer exposure time are used the thermoplastic particles at and adjacent to the surface expand and physically break the smooth outer skin of the foam composite.

The process of this invention overcomes these problems by the process of subjecting the partly formed polyurethane foam composite to a source of high frequency electrical energy whereby the unexpanded or partly expanded beads are quickly and fully expanded without causing rupture of the surface skin of the foam composite.

SUMMARY OF THE INVENTION

The search for an improved process for making foam composites has been stimulated by the increasing commercial interest in such foam composites for a variety of uses such as crash pads in automobiles and the like for better safety to the occupants as well as other uses such as packaging, cushioning and the like. The improved process of this invention provides a reliable, fast method of making uniform foam composites and overcomes the problems associated with the known processes.

According to this invention an open cell, flexible polyurethane foam precursor is mixed with expandable thermoplastic particles (beads, etc.) containing a blowing agent and said precursor is allowed to react producing a flexible, open-cell polyurethane foam matrix having dispersed therein said thermoplastic particles which as a result of an insufficient exotherm are incompletely expanded or even unexpanded. The improvement of this invention comprises post-heating said foam composite by subjecting it to a sufficient amount of high frequency electrical energy to cause said thermoplastic particles to expand to cellular bodies dispersed throughout said polyurethane foam matrix.

Advantageously, this improved process is fast (as fast as a few seconds), the extent of post-heating can be reliably controlled to prevent overheating which might cause thermal collapse of the cellular bodies or degradation of the foam, rupturing of the outer skin of the foam composite is prevented and foam composites with improved properties such as energy attenuation are obtained.

DETAILED DESCRIPTION OF THE INVENTION

The basic process on which this invention is an improvement is already known as previously shown in the patents cited. Essentially this process for producing a foam composite relies upon the exotherm of the polyurethane reaction to supply the heat necessary for expansion of the expandable thermoplastic plastics dispersed therein. Depending upon the nature of the thermoplastic articles or the polyurethane foam presursor or both, the reaction exotherm is frequently insufficient to fully expand the beads.

To overcome this problem and other associated problems this invention employs a post-heating step to essentially fully expand the thermoplastic beads by subjecting the polyurethane-thermoplastic composite to high frequency electrical energy (dielectric and microwave). The extent of post-heating can be readily controlled to prevent over-heating of the resultant composite and yet provide sufficient heat to fully expand the thermoplastic particles.

High frequency electrical energy (dielectric and microwave) can be absorbed uniformly through the mass of urethane foam causing very rapid heating. This heat is readily conducted to the expandable particles dispersed throughout the foam. It is not necessary for the particles to absorb high frequency energy themselves but more efficient utilization of the available RF (radio frequency) power results if particles with a high loss factor are employed.

The theoretical temperature rise of a material in an RF field can be calculated from:

$$\Delta T = \frac{7.96\, fE^2}{c\rho\sigma} \cdot \epsilon'' \text{ avg} \cdot \Delta t \cdot 10^{-12}$$

wherein:
$\Delta T$ = temperature rise (° C.)
$f$ = frequency (cycles/sec.)
$E$ = voltage gradient through the same volt/cm.)
$\epsilon''$ = loss factor—ton
$t$ = time of voltage application (min.)
$C_\rho$ = specific heat (cal./gm./° C.)
$\sigma$ = density (gm./cc.)

Application of this equation requires (a) that the output of the RF generator is high enough to supply the required energy; (b) the field intensity be uniform over the entire specimen; and (c) there is no extraneous heat loss or gain.

The Federal Communications Commission has allocated the frequencies of 13.56, 27.12 and 40.68 megacycles per second (mHz.) for industrial RF heating. In the examples of my invention I use a Thermex 7 RB dielectric oven with a 7.5 kv. output at 27.12 megacycles per second. The manufacturer estimates the peak RF voltage on the 15 inch by 15 inch electrodes at 20 kv. when the plate separation is 2.5 inches. This machine can deliver a maximum of 107.5 kilocalories per minute to a material which could absorb all of its energy. The fraction of this potential energy which can be converted to useful heat depends upon the loss factor of the dielectric and the amount of it in the field between the electrodes. Lower frequencies down to 6 mHz. or higher frequencies (microwaves 915—22,500±25 mHz.) may also be employed.

The dielectric heating of a material in an RF field may be due to dipole rotation or ionic oscillations. Since no two elements exhibit the same affinity for electrons, different atoms in a diatomic molecule produce structures in which the positive and negative centers do not coincide. The dipole moment is a meature of the polarity of a molecule. It is a product of either of two charges of opposite side in a molecule and a distance between them. Thus, $\mu = ed$. The values of dipole moments are expressed in "Debyes" (the product of the electron charge, $e$ is about $10^{-10}$ and the distance separating charge centers, $d$ is about $10^{-8}$ centimeters, therefore $10^{-18}$ esu. is about 1 Debye). When a molecule having a sufficiently high moment is in an alternating field it will tend to rotate as the sign of the electrode alternates. Different molecular groupings may exhibit widely differing values for the group "moment."

Basically then, this invention is concerned with the use of high frequency or microwave energy to cause expansion of dispersed expandable thermoplastic particles in a foamed polyurethane matrix. Either the matrix or the dispersed particles must be capable of absorbing RF energy and heating.

Any thermoplastic material which may be expanded or foamed under the influence of heat may be employed in this improved process. Generally, the thermoplastic materials are prepared to contain from about 1 to 15 percent by weight or so of a blowing agent so that under the influence of heat the thermoplastic softens or melts sufficiently that the blowing agent causes expansion of the particle to a cellular body.

By blowing agent it is meant to include any of those which are commercially utilized for such purposes such as carbon dioxide, dichlorodifluoromethane, other similar mixed halocarbons, pentane and other similar low boiling hydrocarbons. Also included within the term, blowing agent, are such materials as heat-sensitive gas generating agents (liquid or solid) which upon thermal decomposition generate nitrogen, carbon dioxide and the like. The method of incorporating such blowing agents in the thermoplastic particle are well known and need no description in this application.

Typical suitable thermoplastic materials are polystyrene and other monovinyl aromatic monomer polymers and copolymers. In addition to styrene, aromatic monomers include vinyltoluene, α-methyl styrene, t-butyl styrene and the like. Copolymers may be prepared from the aromatic monomers and a variety of other copolymerizable monomers such as acrylonitrile, alkyl acrylates and methacrylates, hydroxyalkyl acrylates and methacrylates, and the like. Advantageously, such comonomers introduce a polar group into the copolymer which directly absorbs the RF energy and heats the copolymer. Thermoplastics such as polystyrene absorb almost no RF energy and expansion is dependent on heat supplied by absorption of RF energy by the polyurethane matrix which has an abundance of energy absorbing groups such as carbamate (urethane), allophanate and the like.

In many instances it is desirable to utilize thermoplastic materials having a greater resistance to thermal collapse. This property may be obtained by lightly crosslinking any of the above polymers or copolymers by employing polyvinyl monomers such as divinyl benzene or the like in their preparation. As little as 0.1 percent by weight or less of said polyvinyl monomer is sufficient to accomplish this purpose. Highly crosslinked polymers should be avoided since they are incapable of expanding to any significant degree. Greater resistance to thermal collapse may also be obtained with such thermoplastics as poly-p-chlorostyrene and the like.

Many other thermoplastics may be employed such as polymers and copolymers of methyl methacrylate, vinylidene chloride, vinyl chloride and the like; esters and ethers such as cellulose acetate, ethyl cellulose and the like; and olefin polymers and copolymers such as polyethylene, polypropylene, chlorinated polyethylene and the like.

Energy absorbing materials may also be separately added to the thermoplastic so that heat is generated directly in or on the surface of the particle. Small molecules with high dipole moments such as benzonitrile and the like are quite effective.

The polyurethane foam matrix may be any of the polyether polyol urethane foams having predominantly open cells, i.e. at least about 50% and preferably 80% or more open cells. Such foams are prepared by reaction of a polyisocyanate, e.g. toluene diisocyanate or polymethylene polyphenyl isocyanate, with a polyether polyol such as a propylene oxide adduct of an aliphatic glycol or polyhydric alcohol having as many as eight hydroxyl groups per alcohol molecule. Propylene oxide may be partially replaced, usually no more than about 20% or so, by another oxide such as ethylene oxide, butylene oxide and the like. The polyether polyol preferably has a hydroxyl equivalent weight of about 500 to 2000, but the invention is not restricted thereto and other lower or higher equivalent weight polyols may be used. In addition to the polyisocyanate and polyol the polyurethane foam precursor normally contains other ingredients such as a catalyst, surfactant, water or a volatile foaming agent, and the like. The polyisocyanate may also be prereacted with a portion of the polyol forming what is commonly called a "prepolymer." Common foaming agents are pentane, dichlorodifluoromethane and other similar mixed halohydrocarbons.

The polyisocyanate may be employed in excess ranging from about 0.9 to 2 —NCO groups per hydroxyl group. Frequently an excess of —NCO groups is used in combination with water to generate in situ carbon dioxide as a foaming agent.

Composite foams are generally made by adding the expandable thermoplastic particles to the polyether polyol and other additives (catalyst, foaming agent, surfactant, etc.) followed by addition of the polyisocyanate with good mixing. The mixture may then be poured into a mold or on a moving belt, etc. and allowed to react and foam. The product is then placed or passed between the electrodes of the RF generator to complete the foaming. Other methods of mixing may be employed such as disclosed in U.S. 3,256,218.

The resultant density of the composite foam may be varied widely depending on the choice of polyurethane reactants and amounts and on the proportions of thermoplastic particles to polyurethane precursor. Densities of about 0.5 to 5 lbs./cu. ft. may be readily prepared and the proportions by volume of the components of the foam composite may range from about 40 to 90 percent opencell polyurethane foam matrix and correspondingly about 60 to 10 percent of expanded (foamed) thermoplastic cellular bodies.

The invention is illustrated but not limited by the following examples. All parts and percentages are by weight unless otherwise specified.

Example 1

(A) A liquid urethane foam precursor was prepared from 500 gm. of a glycerine-polyoxypropylene triol (M.W. of about 3000), 25 gm. water, 3 gm. stannous octoate, 5 gm. triethylene diamine (Dabco), 7 gm. of a silicone-glycol copolymer surfactant and 285 gm. of toluene diisocyanate (TDI).

This precursor reacts rapidly producing a low density (about 1.65 lbs./cu. ft.), open-cell, flexible foam. In the center of a one cubic foot block of foam the temperature may reach 140° C. during cure.

(B) A composite foam was prepared by adding 250 grams of lightly crosslinked polystyrene beads (18–30 mesh, 0.055% divinyl benzene) to the above precursor formulation prior to adding the TDI. The mixture was poured into a paperboard box, 11" x 17" x 10", and allowed to foam. The resultant foam had a bulk density of 1.84 lbs./cu. ft. The temperature at the center of the foam reached 130° C. Samples of the core of the composite were analyzed and the volume fraction of expanded beads was 0.27 and the volume fraction of urethane foam was 0.73. The bead density itself was 1.56 lbs./cu. ft. showing an expansion ratio of 40 times initial solid bead volume. This test demonstrates that when a sufficiently thick specimen is foamed, the exotherm is sufficient to expand the polystyrene bead.

(C) When the same composition, as in (B) is poured into an aluminum mold made from 0.125" thick plates 2 inches apart, the temperature at the center of the mold only reached 104° C. and little or no expansion of the polystyrene beads occurred within ½ inch of the mold. At the center the volume fraction of polystyrene beads was only 0.12 (a density of 4.26 lbs./cu. ft. showing an expansion ratio of only 14.7, compared to 40 above in test (B)) and of polyurethane foam was 0.88. The beads were not fully expanded in this case.

(D) A 3" x 8" x 2" thick sample of foam, as prepared in C, was placed between the electrodes (2.5" spacing) of a 27 mHz. 7.5 kw. dielectric oven. The peak voltage at this spacing (15" x 15" electrodes) was 20 kw. After 1 minute of exposure the composite foam was removed and analyzed as before with these results:

Volume fraction polystyrene foamed beads—0.22
Volume fraction polyurethane foam—0.78
Density of bead foam—2.24 lbs./cu. ft.

Compared to test (C) the RF heating clearly caused substantial foaming of the expandable polystyrene beads.

Example 2

The same flexible urethane foam precursor of Example 1 was combined with similar lightly crosslinked expandable polystyrene beads in the respective weight proportions of 76.75/23.25 and a foam composite prepared in a mold as in test 1, (C). As before the maximum temperature at the center was only 106° C. during cure and caused partial expansion of the beads mainly in the center. Very little expansion occurred within the one-half inch of foam adjacent the mold.

One-half inch of foam was cut from the top and the bottom and the center section was analyzed as before.

Volume fraction of polystyrene beads—0.157
Density of polystyrene beads—4.18 lbs./cu. ft.
Volume fraction of polyurethane foam—0.843
Density of polyurethane foam—2.58 lbs./cu. ft.

Sample portions, 4" x 4", were placed between the dielectric oven electrodes with a spacing of 2.62" for 15, 30, 45 and 60 seconds and analyzed as before and for compressive strength at various percent deflections.

| No. | Time in the RF field (sec.) | Vol. fract. bead foam | Vol. fract. flexible urethane | Bead density, lbs./ft.$^3$ | Urethane density, lbs./ft.$^3$ |
|---|---|---|---|---|---|
| 1 | 0  | 0.157 | .843 | 4.18 | 2.58 |
| 2 | 15 | 0.168 | .832 | 3.74 | 2.51 |
| 3 | 30 | 0.177 | .823 | 3.51 | 2.49 |
| 4 | 45 | 0.260 | .740 | 2.32 | 2.69 |
| 5 | 60 | 0.092 | .908 | 7.17 | 2.41 |

| | Compressive strength (lbs./in.$^2$) deflection | | | | |
|---|---|---|---|---|---|
| No. | 5% | 10% | 25% | 50% | 75% |
| 1 | 0.03 | 0.17 | 0.64 | 1.83 | 19.48 |
| 2 | 0.10 | 0.27 | 0.57 | 2.41 | 30.45 |
| 3 | 0.07 | 0.30 | 2.43 | 5.58 | 38.71 |
| 4 | 0.23 | 0.60 | 2.55 | 8.54 | 42.49 |
| 5 | 0.03 | 0.06 | 0.57 | 1.69 | 7.64 |

These data clearly show that the RF heating causes additional expansion of the rigid foam component resulting in increased compressive strength of the composite. Too much heating, however (Sample 5), can result in destruction of the bead foam component. The temperature in the composite in the RF field should not exceed 150° C. with polystyrene type beads.

The overall dimensions of the 4" x 4" x 1" samples did not change noticeably during the RF heating experiment.

Example 3

A polyurethane foam precursor was prepared to contain 67.7% of a 3000 M.W. triol similar to Example 1, 0.68% silicone-glycol copolymer, 0.27% N-ethyl morpholine, 0.033% triethylene diamine, 0.3% stannous octoate, 2.23% water and 28.77% toluene diisocyanate (80/20 mixture of the 2,4 and 2,6 isomers, respectively). This precursor foams to a flexible, open cell foam with a density of 1.8 lbs./cu. ft. in a one cubic foot mold. Maximum temperature at the center was 118° C.

Expandable beads were prepared by suspension polymerization from chlorostyrene (70/30 mixture of ortho and para isomers, respectively) and 0.05% divinyl benzene and 6.8% isopentane as a blowing agent. A mixture of 25% of these beads and 75% of the above precursor was cast and reacted to give a 4" thick slab of composite foam. The maximum temperature reached only 93° C. and the chlorostyrene beads had not expanded.

The foam composite was then placed between the electrodes (4.25" apart) in the dielectric oven with the following results:

| No. | Composition | Foam density (lbs./ft.$^3$) | Vol. fract. bead foam | Compression load, p.s.i. at 65% defl. |
|---|---|---|---|---|
| 1 | Pure urethane | 1.8 | 0 | 1.17 |
| 2 | As cured, 75% urethane, 25% polychlorostyrene beads | 2.46 | [1] 0.008 | 1.23 |
| 3 | (2) After 3 minutes in the RF field | 2.22 | 0.22 | 22.3 |

[1] Solid particles.

The polychlorostyrene beads expanded from a density of 75 lbs./cu. ft. (solid) to 2.52 lbs./cu. ft., an expansion ratio of 29.7. The compression load increased by a factor of 18.

Example 4

Expandable beads (1 mm. dia.) were prepared by suspension polymerization from the following mixture:

|  | Percent |
|---|---|
| o-Chlorostyrene | 74.7 |
| β-Hydroxyethyl acrylate | 18.5 |
| Divinyl benzene | 0.05 |
| n-Pentane | 6.65 |
| Benzoyl peroxide | 0.1 |

25% by weight of these beads was mixed with 75% by weight of the urethane composition described in Example 3. The mixture was cast to obtain a 4" thick slab of flexible open cell urethane foam. The foam center reached 91° C. during cure. No foaming of the dispersed particles of expandable particles in the urethane matrix was apparent.

One inch thick slabs of the foam were placed between the electrodes of the dielectric oven (1" apart) for a period of 15 seconds.

The data for this experiment appear below.

| No. | Composition | Treatment of foam | Foam composite (lbs./ft.$^3$) | Vol. fract. bead foam | Bead foam, lbs./ft.$^3$ | Urethane foam, lbs./ft.$^3$ |
|---|---|---|---|---|---|---|
| 1 | 25% beads, 75% urethane. | None | 2.38 | 0.009 | [1] 75 | 1.78 |
| 2 | do | 15 secs. RF heating. | 2.21 | 0.19 | 2.9 | 2.05 |

[1] Solid.

The beads used in this experiment are of sufficiently high electrical loss factor that they will heat and foam rapidly in an RF field without the urethane. Under the above conditions, the beads in the foam matrix expanded 26 times their initial volume. Similar results are found if styrene is employed in place of o-chlorostyrene or if the β-hydroxyethyl acrylate is replaced by β-cyanoethyl acrylate, citraconic anhydride or acrylonitrile.

In all the previous examples the composite foams prepared by heating in the dielectric oven had a generally smooth, unbroken surface (skin). However when similar composite foams having partly expanded or unexpanded beads were subjected to heat from an external heat surface (ovens, etc.) the beads expanded and those at and adjacent to the surface ruptured the surface giving a "pebbly" effect.

What is claimed is:

1. In a process for preparing a composite foam comprising a flexible, open cell polyurethane foam matrix and expanded thermoplastic particles dispersed therein wherein expandable thermoplastic particles containing a blowing agent incorporated therein are admixed with a polyurethane foam precursor containing a foaming agent, wherein the polyurethane precursor reacts exothermally to produce a flexible, open cell polyurethane foam matrix and wherein the exotherm is insufficient to cause substantial expansion of the thermoplastic particles, the process improvement which comprises post-heating said composite foam by subjecting it to high frequency electrical energy for a time sufficient to expand said thermoplastic particles.

2. The process of claim 1 wherein said polyurethane is prepared from a polyether polyol having a hydroxyl equivalent weight of about 500 to 2000.

3. The process of claim 1 wherein said thermoplastic is polystyrene or polychlorostyrene.

4. The process of claim 1 wherein said thermoplastic is lightly crosslinked to increase its resistance to thermal collapse.

5. The process of claim 1 wherein said thermoplastic is a copolymer of a vinyl aromatic monomer and a copolymerizable monomer having a radio frequency energy absorbing group.

References Cited
UNITED STATES PATENTS

| | | | |
|---|---|---|---|
| 3,251,916 | 5/1966 | Newnham et al. | 264—DIG. 7 |
| 3,452,122 | 6/1969 | Stern et al. | 264—DIG. 7 |
| 3,336,184 | 8/1967 | Stastny et al. | 264—46 X |

FOREIGN PATENTS

| | | | |
|---|---|---|---|
| 1,197,609 | 7/1965 | Germany | 264—DIG. 7 |
| 1,474,167 | 2/1967 | France | 264—DIG. 7 |

PHILIP E. ANDERSON, Primary Examiner

U.S. Cl. X.R.

161—159, 164, 165, 190; 260—2.5 A; 264—46, 53, 54, DIG. 7